C. H. WILD & C. MAHAN.
APPARATUS FOR COATING CANDIES WITH SUGAR.
APPLICATION FILED JULY 9, 1909.
945,355. Patented Jan. 4, 1910.
3 SHEETS—SHEET 1.
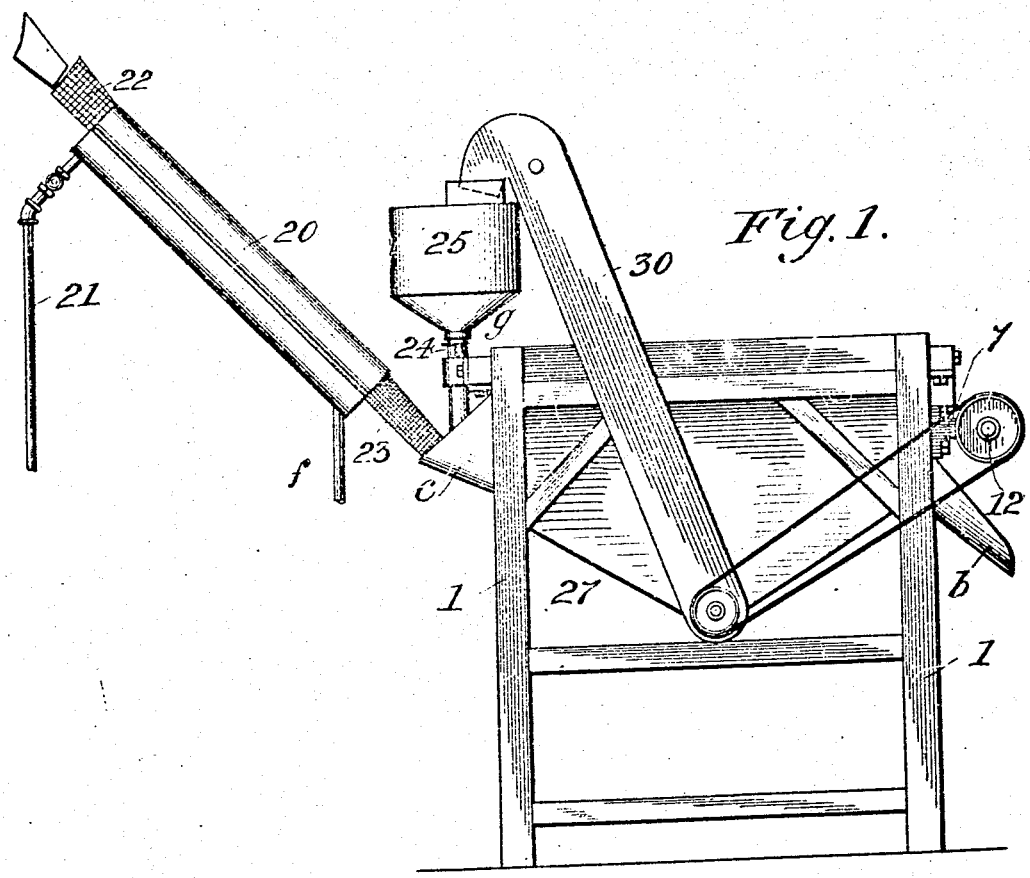
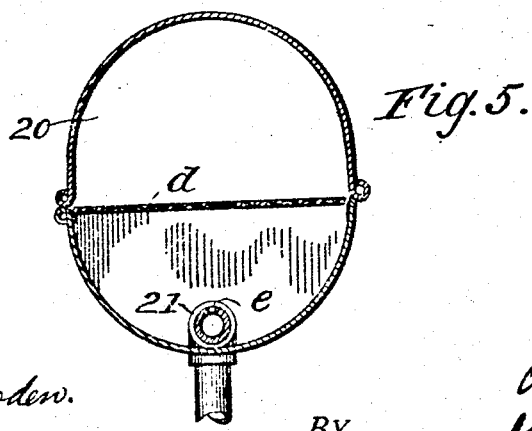

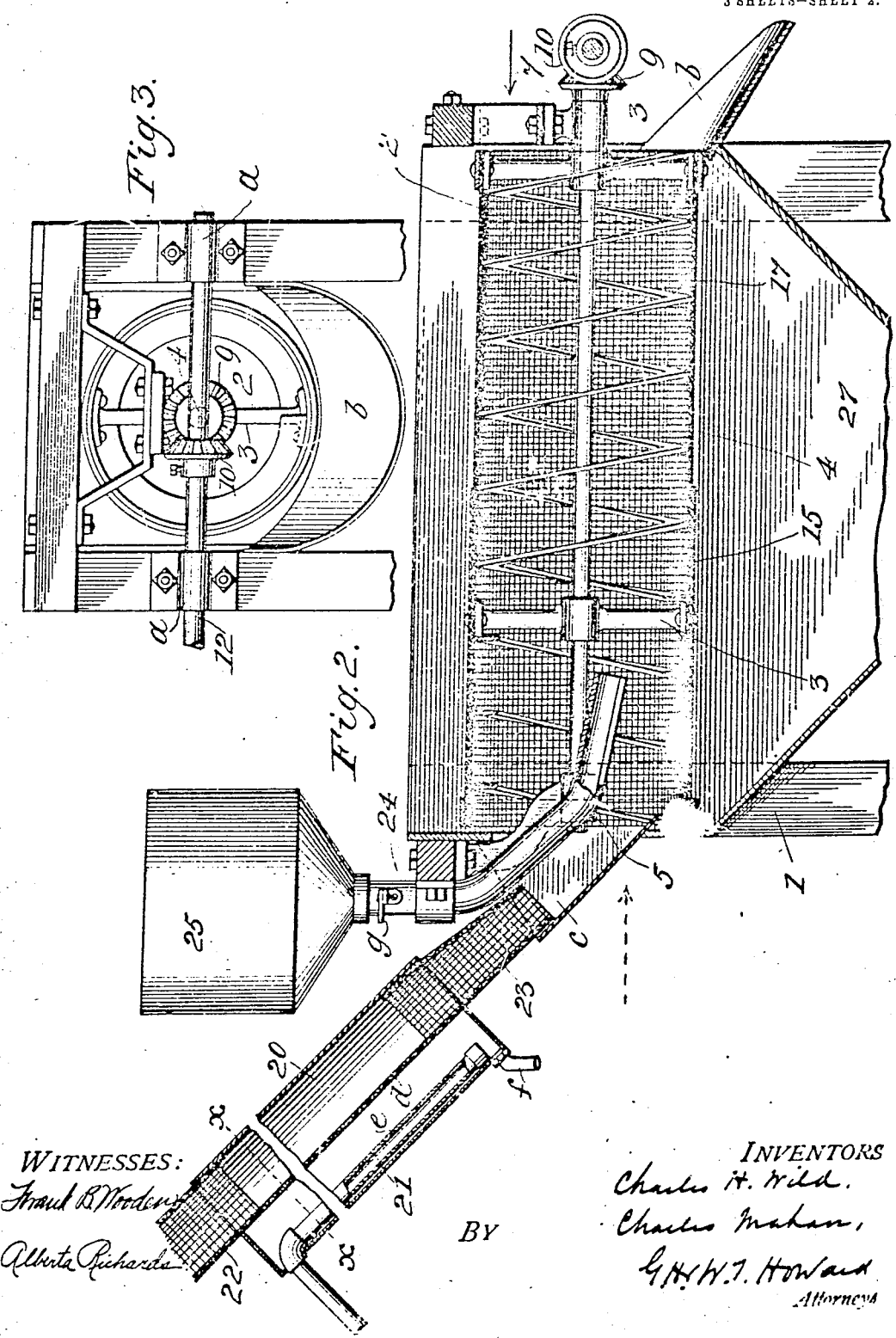

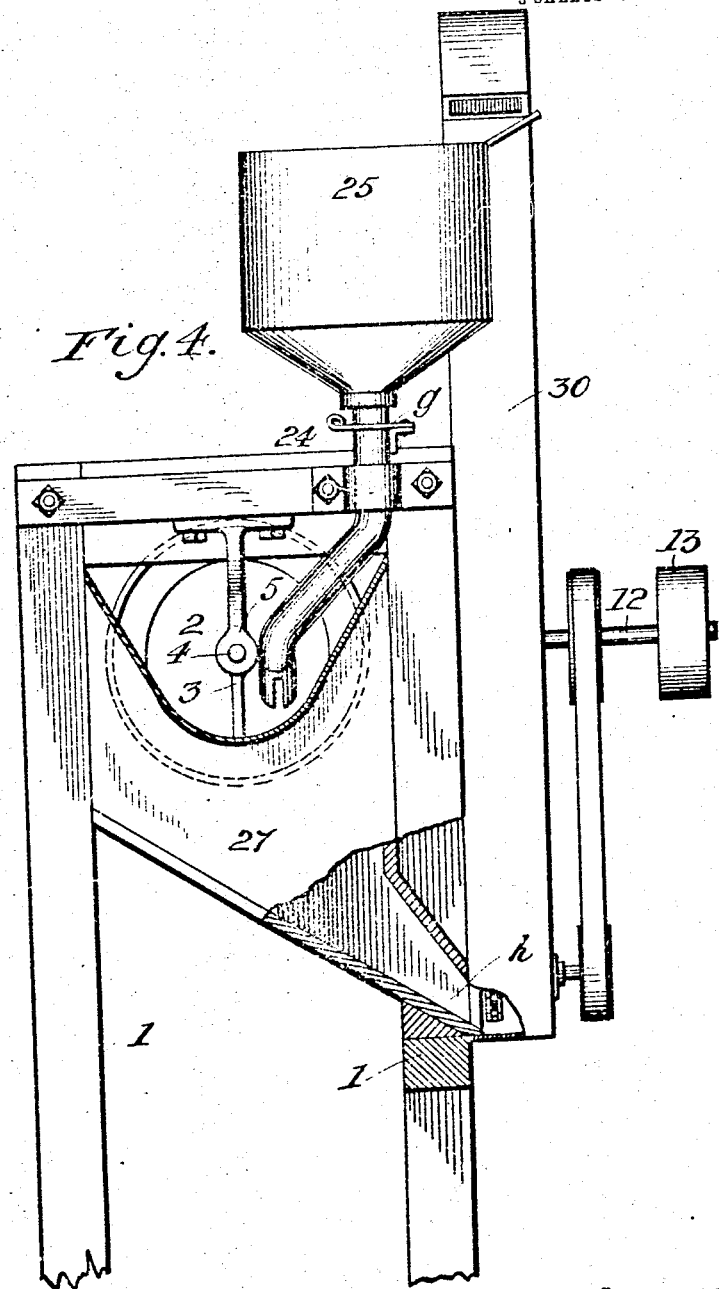

UNITED STATES PATENT OFFICE.

CHARLES H. WILD AND CHARLES MAHAN, OF BALTIMORE, MARYLAND.

APPARATUS FOR COATING CANDIES WITH SUGAR.

945,355.

Specification of Letters Patent.   Patented Jan. 4, 1910.

Application filed July 9, 1909. Serial No. 506,741.

*To all whom it may concern:*

Be it known that we, CHARLES H. WILD and CHARLES MAHAN, both of the city of Baltimore and State of Maryland, have invented certain Improvements in Apparatus for Coating Candies with Sugar, of which the following is a specification.

This invention relates to an improved apparatus whereby candies such for instance as gum drops, are coated with granulated sugar, a process preliminary to their immersion in a solution of sugar to give them a glazed surface.

In the further description of the said invention which follows, reference is made to the accompanying drawings forming a part hereof, and in which,—

Figure 1 is an exterior side view of the apparatus. Fig. 2 is a sectional side view of certain parts of the apparatus on an enlarged scale. Fig. 3 is an end view of Fig. 2 looking in the direction indicated by the arrow in full lines. Fig. 4 is an end view of Fig. 2 looking in the direction indicated by the dotted arrow, and with certain parts of the apparatus removed. Fig. 5 is an enlarged section of Fig. 2 taken on the dotted line $x$—$x$.

Referring now to the drawing, 1 is the frame of the apparatus, and 2 a cylinder having a reticulated wall, preferably formed of wire-work and open at its ends. The cylinder is secured by means of the arms 3 to the rotary shaft 4 which is supported in the bearings 5 and 7.

To one end of the shaft 4 is fastened a miter gear wheel 9 in mesh with a similar miter gear 10 on the horizontal driving shaft 12 which is properly supported by bearings $a$ on the frame 1. The driving pulley is denoted by 13 and shown only in Fig. 4.

The reticulated surface of the cylinder 2 for about one half its length is covered by an imperforate cylindrical covering 15 shown in Fig. 2 for a purpose hereinafter described, and as the two cylinders rotate together, they constitute practically a single device.

Within the cylinder 2 and adapted to rotate with it is a screw conveyer 17 a part of which to the left of Fig. 2 is shown in section; and the object of this conveyer is to carry materials introduced into the cylinder, from left to right and discharge them to the spout $b$.

At the entrance end of the apparatus and leading into the cylinder 2 is a stationary chute $c$; and above this chute and placed in an inclined position, is a fixed sheet-metal chamber 20 having therein a perforated or wire-work partition $d$.

Beneath the partition $d$ is a steam pipe 21 which is closed at its end and provided at its upper side with a number of small holes $e$ for the escape of steam which passes through the partition to the portion of the chamber above it.

At the upper end of the chamber 20 is a wire-work pipe 22 which leads to an upper portion of the building, and into which the gum drops to be coated are poured. At the lower end of the said chamber is a wire-work delivery pipe 23 which extends into the chute $c$. A drain pipe $f$ carries off the water of condensation which collects in the chamber 20.

At the upper end of a fixed pipe 24 is a hopper 25 for granulated sugar, and the lower end of the said pipe extends into the cylinder 2 when it is slotted at its under side to effect a distribution of the sugar as it falls into the cylinder. A gate $g$ in the pipe 24 is used to regulate the feed of sugar to the cylinder 2.

Beneath the cylinder 2 is a receptacle 27 for the surplus sugar or that which escapes through the meshes of the cylindrical wall, and 30 an ordinary elevating conveyer which receives the surplus sugar from the spout $h$, and returns it to the hopper 25.

Supposing the hopper 25 to contain granulated sugar, the chamber 20 to be filled with steam which has escaped from the pipe 21, the cylinder to be in rotation, and gum drops to be passing through the chamber to the cylinder, the operation of the apparatus is as follows: The gum drops which are of a gelatinous nature and practically dry, when coming into contact with steam in the chamber 20 are moistened and rendered sticky, and upon entering the rotary cylinder in that condition are mixed with the granulated sugar and become coated with the same. In the rotation of the cylinder the coated gum drops and the loose sugar about them are carried forward by the screw conveyer, and as soon as they reach the end of the imperforate cylinder 15 the surplus sugar falls through the wall of the cylinder to the receptacle 27 from which it is lifted by the conveyer 30 and thrown back into the hopper 25. The gum drops being too large to escape with the surplus sugar are discharged from the spout *h* in a proper condition for immersion in the sugar solution after which they are drained and allowed to dry.

We claim as our invention,—

1. In an apparatus to coat gum drops with granulated sugar, the combination of means to dampen the surface of the drops and while in that condition introduce them into an agitated body of granulated sugar, and appliances to subsequently separate the coated drops from the surplus sugar, substantially as specified.

2. In an apparatus to coat gum drops with granulated sugar, a reticulated rotary cylinder having therein a screw conveyer, a steam chamber, and means to convey the gum drops through the steam chamber to the cylinder, combined with an elevated hopper for granulated sugar and a pipe to deliver the sugar from the hopper to the said cylinder, substantially as specified.

3. In an apparatus to coat gum drops with granulated sugar, a reticulated rotary cylinder having therein a screw conveyer, a steam chamber, and means to convey the gum drops through the steam chamber to the reticulated cylinder which separates the coated drops from the surplus sugar, combined with an elevated hopper for granulated sugar, and a pipe to deliver the sugar from the hopper to the said cylinder, substantially as specified.

4. In an apparatus to coat gum drops with granulated sugar, a reticulated rotary cylinder having therein a screw conveyer, a steam chamber, and means to convey the gum drops through the steam chamber to the reticulated cylinder which separates the coated drops from the surplus sugar, combined with an elevated hopper for granulated sugar, a pipe to deliver the sugar from the hopper to the said cylinder, and a conveyer to return the separated sugar to the hopper, substantially as specified.

CHARLES H. WILD.
CHARLES MAHAN.

Witnesses:
Wm. T. Howard,
Wilder Emory.